US012607225B2

(12) United States Patent
Allison et al.

(10) Patent No.: US 12,607,225 B2
(45) Date of Patent: Apr. 21, 2026

(54) TOROID SEPARATOR WITH LUBRICANT CHANNELS FOR BALL BEARINGS

(71) Applicant: AKTIEBOLAGET SKF, Gothenburg (SE)

(72) Inventors: Bryan D. Allison, Clymer, NY (US); Francois Niarfeix, Bloomfield Hills, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 38 days.

(21) Appl. No.: 18/401,823

(22) Filed: Jan. 2, 2024

(65) Prior Publication Data

US 2025/0215930 A1 Jul. 3, 2025

(51) Int. Cl.
*F16C 33/37* (2006.01)
*F16C 33/372* (2006.01)
*F16C 33/38* (2006.01)
*F16C 33/66* (2006.01)

(52) U.S. Cl.
CPC ........ *F16C 33/372* (2013.01); *F16C 33/3706* (2013.01); *F16C 33/3818* (2013.01); *F16C 33/6629* (2013.01); *F16C 33/6651* (2013.01); *F16C 33/6681* (2013.01); *F16C 33/6614* (2013.01)

(58) Field of Classification Search
CPC .. F16C 33/37; F16C 33/3706; F16C 33/3713; F16C 33/372; F16C 33/6614; F16C 33/6629; F16C 33/6681; F16C 33/3818; F16C 33/6651
See application file for complete search history.

(56) References Cited

U.S. PATENT DOCUMENTS 4,277,117 A 7/1981 George
8,167,501 B2 5/2012 Perkinson et al.
(Continued)

FOREIGN PATENT DOCUMENTS

EP 164968 A * 12/1985 .............. F16C 19/20

OTHER PUBLICATIONS

Unpublished U.S. Appl. No. 18/457,473, Bryan D. Allison, filing date: Aug. 29, 2023.

*Primary Examiner* — Alan B Waits
(74) *Attorney, Agent, or Firm* — J-TEK LAW PLLC; Scott T. Wakeman; Mark A. Ussai

(57) ABSTRACT

A separator is provided for a ball bearing including inner and outer rings and a plurality of balls disposed between the inner and outer rings. The separator includes an annular body having a centerline, opposing first and second axial ends spaced apart along the centerline, an inner circumferential surface defining a central pocket sized to receive one of the plurality of balls and an outer circumferential surface defining an outer perimeter. A plurality of inner axial channels extend radially outwardly from the inner circumferential surface and a plurality of outer axial channels extend radially inwardly from the outer circumferential surface, each inner axial channel and each outer axial channel being configured to contain lubricant. Preferably, both the inner and outer axial channels are spaced circumferentially about the centerline and each channel extends entirely axially between the first and second axial ends of the annular body.

12 Claims, 6 Drawing Sheets

(56)          References Cited

U.S. PATENT DOCUMENTS

| | | | |
|---|---|---|---|
| 2011/0311175 A1* | 12/2011 | Damato | .................. F16C 33/37 |
| | | | 384/521 |
| 2016/0017918 A1* | 1/2016 | Corley | ................ F16C 33/3706 |
| | | | 384/522 |
| 2017/0211629 A1 | 7/2017 | An et al. | |

* cited by examiner

TOROID SEPARATOR WITH LUBRICANT CHANNELS FOR BALL BEARINGS

BACKGROUND OF THE INVENTION

The present invention relates to bearings, and more particularly to separators for ball bearings.

Cages for ball bearings are well known and typically include an annular body with a plurality of circumferentially-spaced pockets, each pocket receiving a separate one of the balls of the bearing. The cage establishes a desired spacing between adjacent balls and guides the elements as the elements traverse a pitch circle defined between the bearing inner and outer rings. In certain applications, particularly in ball bearings, separators are used instead of cages and typically include an annular body with a single pocket that fits about an individual ball. Generally, a plurality of the separators are installed about half of the balls in a set of balls, with every other ball merely contacting two adjacent separators, such that the separators establish a desired spacing between all of the balls.

As end users often use substantially less lubricant than is recommended by bearing manufacturers in order to avoid contamination due to lubricant leakage, certain separators have been provided that are formed of a material, such as polytetrafluoroethylene ("PTFE"), having inherent lubricating properties. However, such lubricious materials have relatively low wear resistance, leading to a failure of the separators formed of these materials. In contrast, separators formed of higher wear resistance materials, such as polyetheretherketone ("PEEK"), provide satisfactory wear resistance, but have increased friction and require a greater quantity of lubricant to avoid failure.

SUMMARY OF THE INVENTION

In one aspect, the present invention is a separator for a ball bearing, the ball bearing including inner and outer rings and a plurality of balls disposed between the inner and outer rings. The separator comprises an annular body having a centerline, opposing first and second axial ends spaced apart along the centerline, an inner circumferential surface defining a central pocket sized to receive one of the plurality of balls and an outer circumferential surface defining an outer perimeter. A plurality of axial channels extend radially outwardly from the inner circumferential surface and/or extend radially inwardly from the outer circumferential surface, each axial channel being configured to contain lubricant.

In another aspect, the present invention is again a separator for a ball bearing, the ball bearing including inner and outer rings and a plurality of balls disposed between the inner and outer rings. The separator comprises an annular body having a centerline, opposing first and second axial ends spaced apart along the centerline, an inner circumferential surface defining a central pocket sized to receive one of the plurality of balls and an outer circumferential surface defining an outer perimeter. A plurality of inner axial channels extend radially outwardly from the inner circumferential surface and a plurality of outer axial channels extend radially inwardly from the outer circumferential surface, each inner axial channel and each outer axial channel being configured to contain lubricant.

In a further aspect, the present invention is a bearing assembly comprising an inner ring having a centerline, an outer ring disposed about the inner ring, a number N of balls disposed between the inner and outer rings and spaced circumferentially about the centerline so as to define a pitch circle and a number X of separators, the number X being equal to one half a value of N. Each separator includes an annular body having a centerline, opposing first and second axial ends spaced apart along the centerline, an inner circumferential surface defining a central pocket sized to receive one of the balls and an outer circumferential surface defining an outer perimeter. A plurality of axial channels extend radially outwardly from the inner circumferential surface and/or extend radially inwardly from the outer circumferential surface, each axial channel being configured to contain lubricant.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
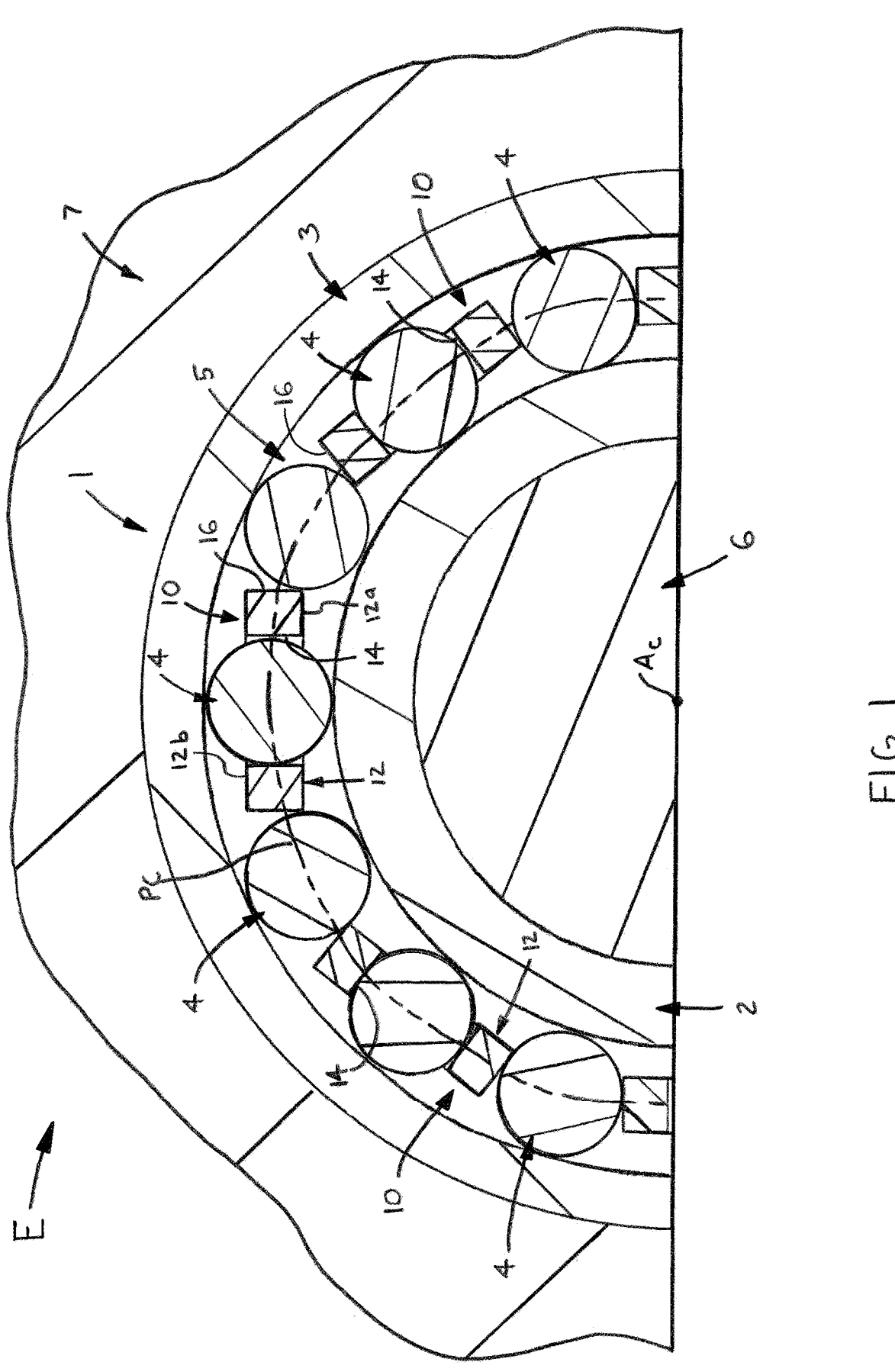
FIG. 1 is a radial cross-sectional view through a ball bearing including a plurality of separators of the present invention, the bearing coupling a shaft with an outer member of a machine.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-7 a toroid separator 10 for a ball bearing 1, the bearing 1 including an inner ring 2 with an inner race $R_I$, an outer ring 3 with an outer race $R_O$, and a plurality of the balls 4 disposed between the inner and outer rings 2, 3 and forming a ballset 5. The ball bearing 1 functions to rotatably couple an inner member 6, such as a shaft, with an outer member 7, for example a housing or hub, so that one member 6 or 7 rotates about a central axis $A_C$ as the balls 4 traverse a pitch circle PC (FIG. 1) defined between the rings 2, 3. Preferably, the inner and outer members 6, 7 are components or structural members of a machine or item of equipment E used in any appropriate application. Further, the bearing 1 preferably includes a number N of the balls 4 spaced circumferentially about the central axis $A_C$ so as to define the pitch circle PC, and a number X of separators 10, the number X being equal to one half a value of N and the separators 10 being disposed about every other ball 4 in the ballset 5.

The separator 10 basically comprises a toroidal or annular body 12 having a centerline $L_C$, opposing first and second axial ends 12a, 12b spaced apart axially along the centerline $L_C$, an inner circumferential surface 14 and an outer circumferential surface 16. The annular body 12 further includes a plurality of axial channels 18 extending radially outwardly from the inner circumferential surface 14 and/or extending radially inwardly from the outer circumferential surface 16, each axial channel 18 being configured to contain lubricant L as discussed below.

As used herein, the term "axial channel" includes a channel 18 that extends entirely axially so as to be generally perpendicular to the first and second axial ends 12a, 12b of the body 12 or both partially axially and partially circumferentially, so as to be generally angled with respect to the body first and second axial ends 12a, 12b (e.g., at a forty-five degree angle). Also, the plurality of axial channels 18 may all be angled or extend circumferentially in the same direction or be arranged to extend in opposing circumferential directions, such that each channel 18 may intersect one or more adjacent channels 18 or be separated by a circumferential gap (no alternative structure shown). Further, the plurality of axial channels 18 define a plurality of axial teeth 22, each axial tooth 22 being defined between two adjacent axial channels 18. As such, the annular body 12 preferably has the general appearance of a spur gear.

Furthermore, the inner circumferential surface 14 defines a central pocket 20 sized to receive one of the plurality of balls 4 and has an inside diameter ID (FIG. 5) about equal to or slightly greater than the diameter of each ball 4. As such, each ball 4 disposed within a separator 10 is retained therein but is freely rollable or rotatable within the pocket 20. Also, the outer circumferential surface 16 defines an outer perimeter of the separator 10 and has an outside diameter OD (FIG. 6) that is sized to establish a desired spacing distance SD (FIG. 2) between adjacent balls 4. In other words, the annular body 12 has a radius $R_B$ extending from the centerline $L_C$ to the outer circumferential surface 16 which establishes the minimum spacing distance SD between the ball 4 disposed within the central pocket 20 and each one of the two adjacent balls 4, as indicated in FIG. 2.

Figure 2:
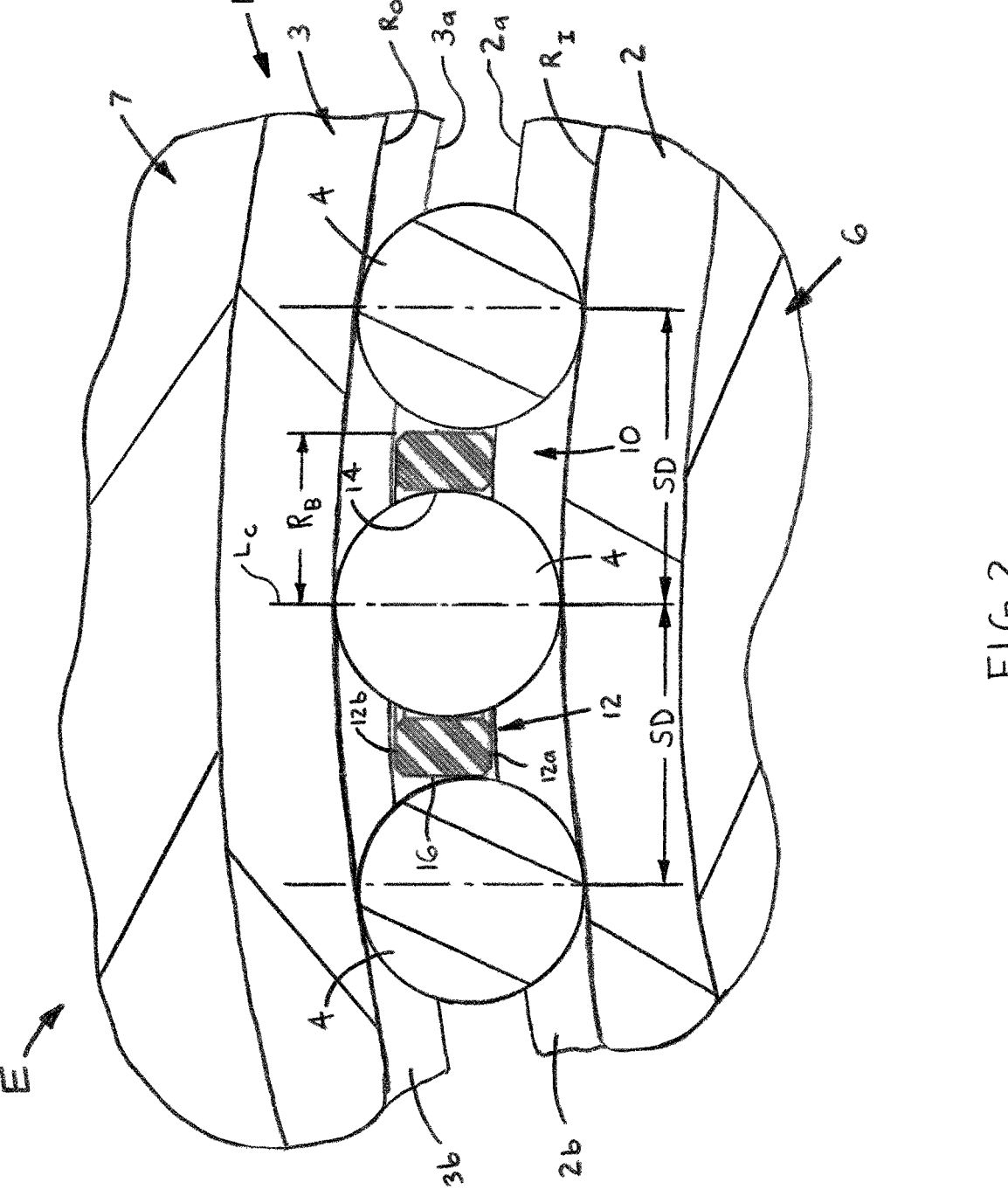
FIG. 2 is an enlarged view of a portion of FIG. 1.
Figure 3:
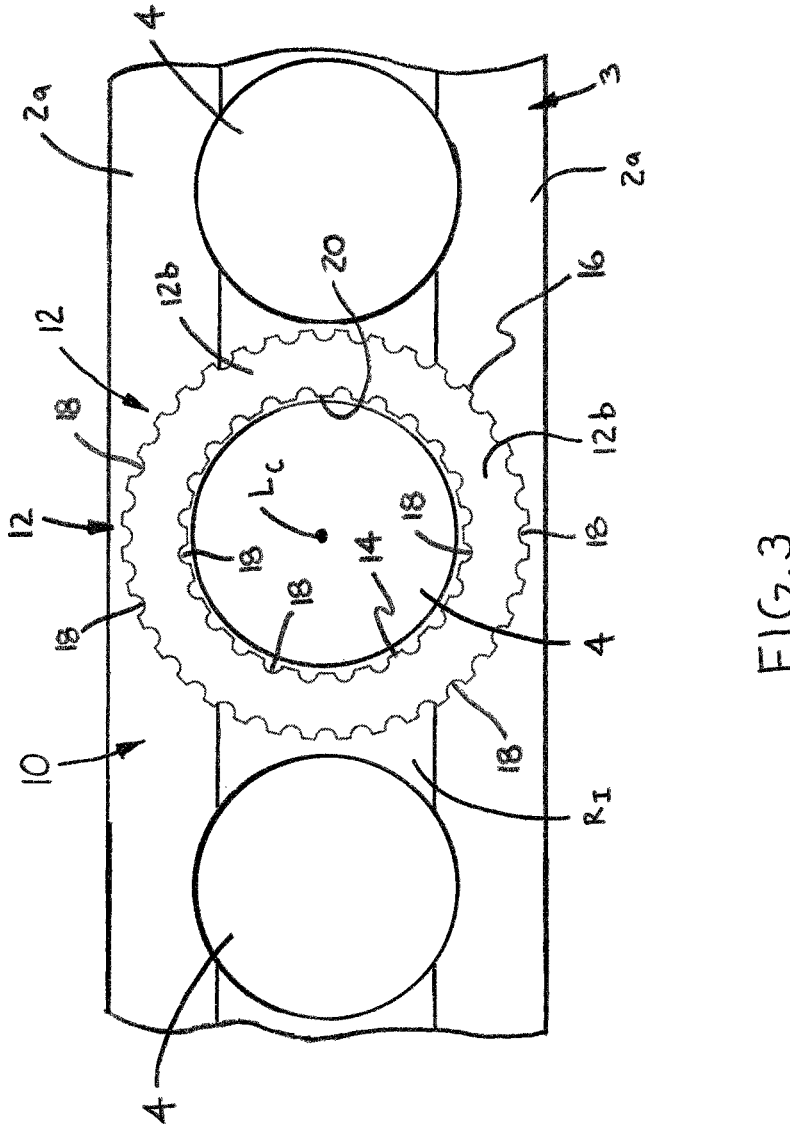
FIG. 3 is a broken-away, end view of a ball bearing inner ring and three balls installed on the inner ring, showing a separator installed on one ball and disposed between two adjacent balls.

As best shown in FIG. 2, the first axial end 12a of the annular body 12 is configured to be slidably disposed upon an outer circumferential surface 2a of the bearing inner ring 2 and/or the second end axial end 12b of the annular body 12 is configured to be slidably disposed against an inner circumferential surface 3a of the bearing outer ring 3. Such contact with the ring surfaces 2a, 3a retains each separator 10 disposed centrally about the particular ball 4 disposed within the pocket 20. More specifically, the first axial end 12a provides an inner retention surface configured to be slidably disposed upon at least one inner guide surface 2a of the bearing inner ring 2 and/or the second axial end 12b provides an outer retention surface configured to be slidably disposed against at least one outer guide surface 3a of the bearing outer ring 3. In a typical application in which the axial ends of the bearing rings 2, 3 lie within vertical planes, the first axial end 12a slides against the outer guide surface 2a of the inner ring 2 when a separator 10 is located within upper quadrants of the bearing 1 and the second axial end 12b slides against the inner guide surface 3a of the outer ring 3 when the separator 10 is disposed within lower quadrants of the bearing 1.

Due to the guide surfaces 2a, 3a supporting either and preferably both of the inner and outer axial ends 12a, 12b, the separator 10 is maintained located centrally about the particular ball 4 disposed within the pocket 20 as the ball 4 traverses the pitch circle PC. Preferably, the at least one guide surface 2a is provided by at least one and preferably two shoulders 2b of the inner ring 2, each providing one of two guide surfaces 2a, located adjacent to the bearing inner race $R_I$. Similarly, the at least one guide surface 4a is provided by at least one and preferably two shoulders 3b (only one shown) of the outer ring 3 located adjacent to the bearing outer race $R_O$. However, either or both of the guide surfaces 2a, 3a may be provided by another portion of the inner or outer bearing rings 2, 3, such as for example, a single circumferentially extending guide projection (not shown) of the inner ring 2 spaced axially from the inner race $R_I$ and/or a single guide projection (not shown) of the outer ring 3 spaced axially from the outer race $R_O$.

Preferably, the annular body 12 is formed of a molded polymeric material, most preferably including polyetheretherketone ("PEEK") and reinforcing fibers (e.g., glass fibers). As such, the separator 10 has a relatively high degree of wear resistance and the lubricant L contained within the channels 18 more than offsets the lack of inherent lubricating properties provided by other separator materials, such as for example, polytetrafluoroethylene ("PTFE"). However, the body 12 may be formed of any other appropriate polymeric materials, such as PTFE, Nylon, etc., a ceramic material or even a metallic material, such as aluminum.

Figure 4:
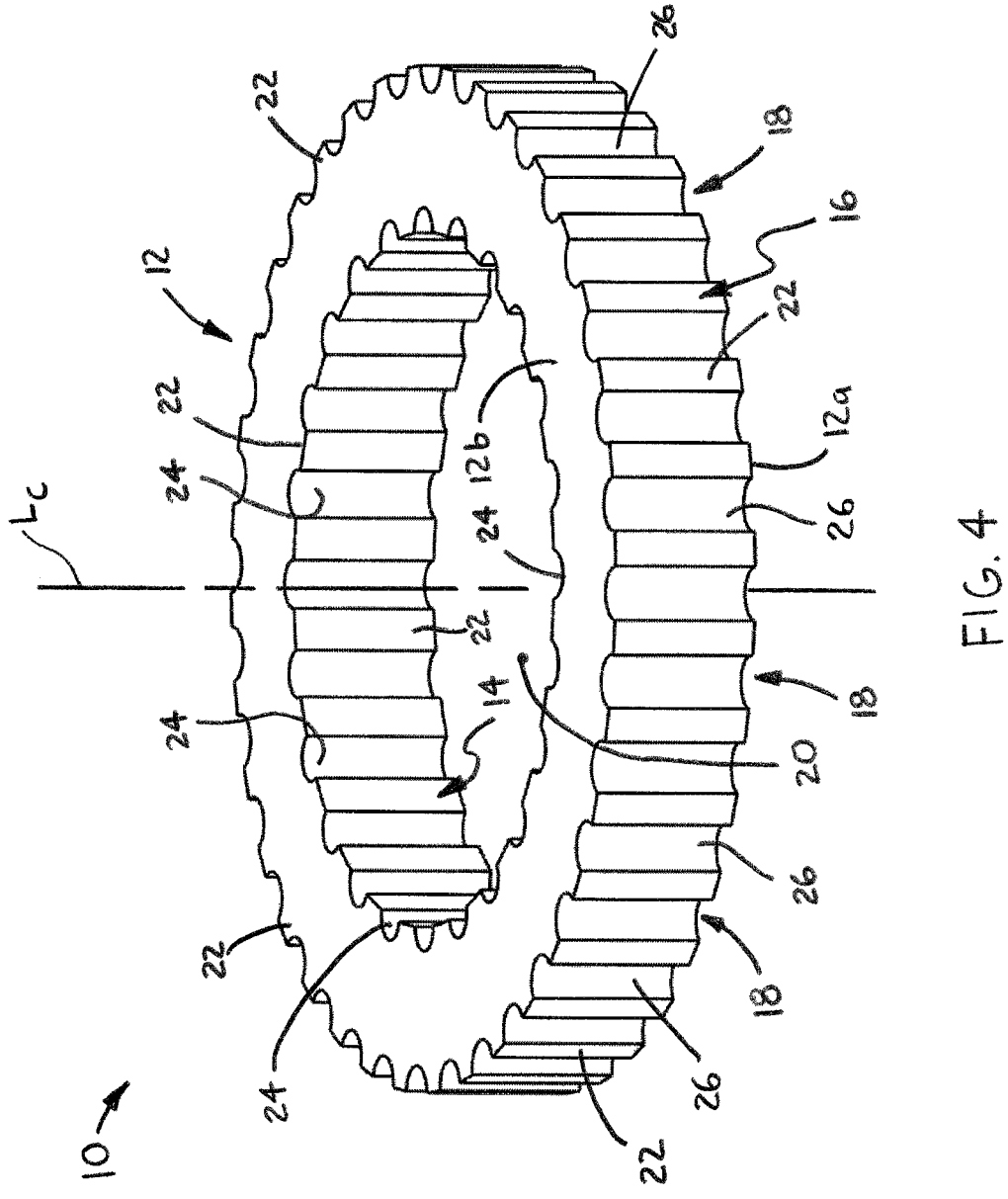
FIG. 4 is a perspective view of the separator.
Figure 5:
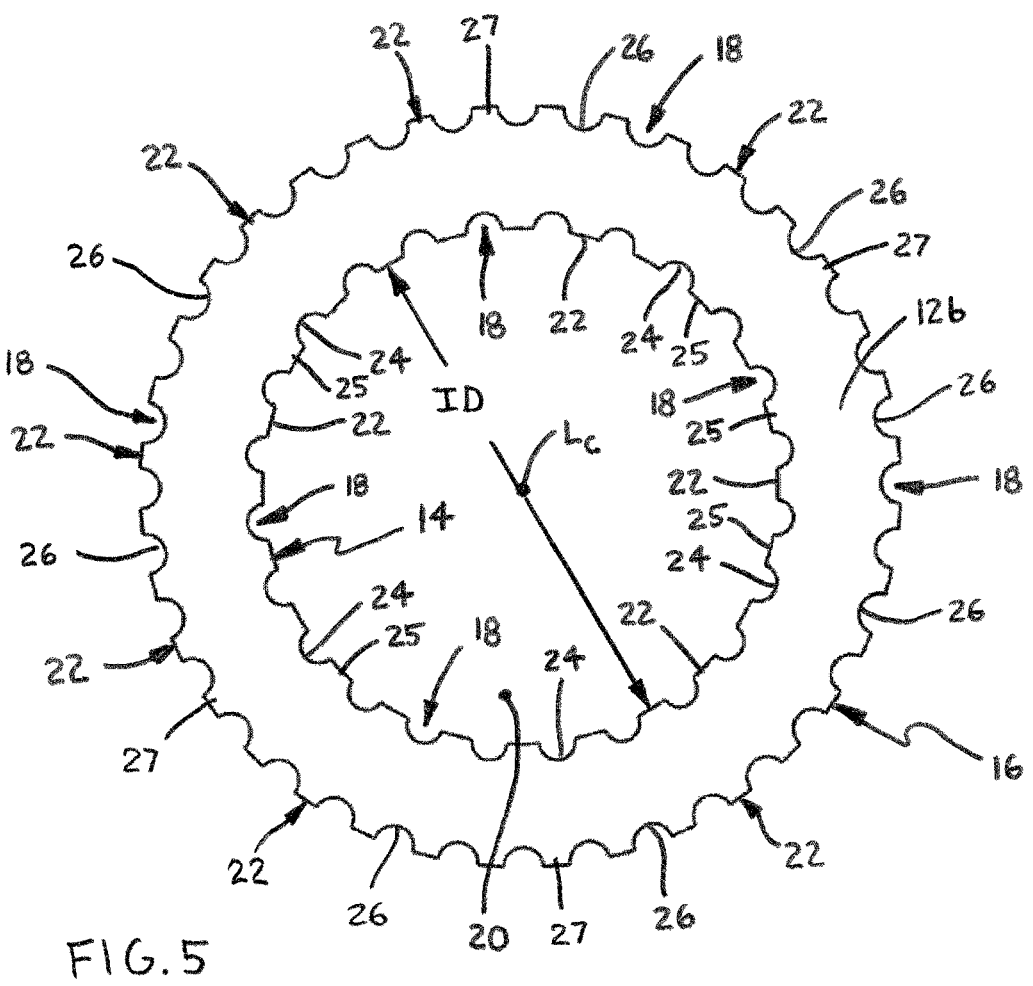
FIG. 5 is a top plan view of the separator.
Figure 6:
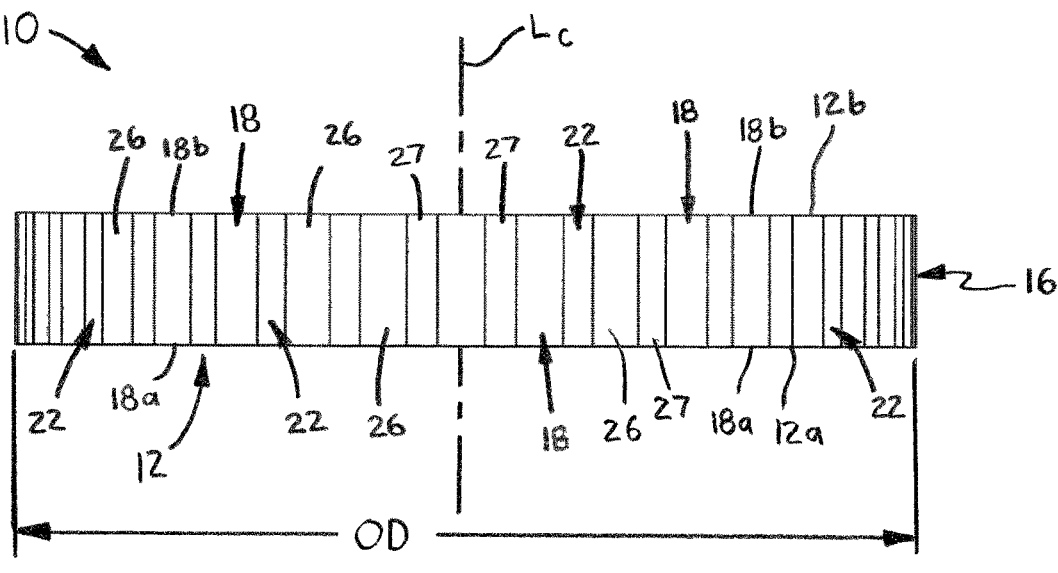
FIG. 6 is a side plan view of the separator.

Referring to FIGS. 4-6, the plurality of axial channels 18 are spaced circumferentially about the centerline $L_C$ and preferably each have a first open end 18a at the first axial end 12a of the annular body 12 and a second open end 18b at the second axial end 12b of the annular body 12, as indicated in FIG. 6. However, each channel 18 may alternatively be "closed" at either or both ends 18a, 18b such that the channel(s) 18 extend only partially between the two ends 12a, 12b of the body 12 (structure not shown). Also, the channels 18 preferably extend substantially axially so as to be at least generally parallel with the body centerline $L_C$ and perpendicular to the body axial ends 12a, 12b, but as discussed above, may be angled, curved or oriented in any desired configuration (no alternatives depicted).

Preferably, the separator 10 includes axial channels 18 on both the inner circumferential surface 14 and on the outer circumferential surface 16. Specifically, the plurality of axial channels 18 includes a first set of inner axial channels 24 extending radially outwardly from the inner circumferential surface 14 and defining a set of inner axial teeth 25 and a second set of outer axial channels 26 extending radially inwardly from the outer circumferential surface 16 and defining a set of outer axial teeth 27.

Figure 7:
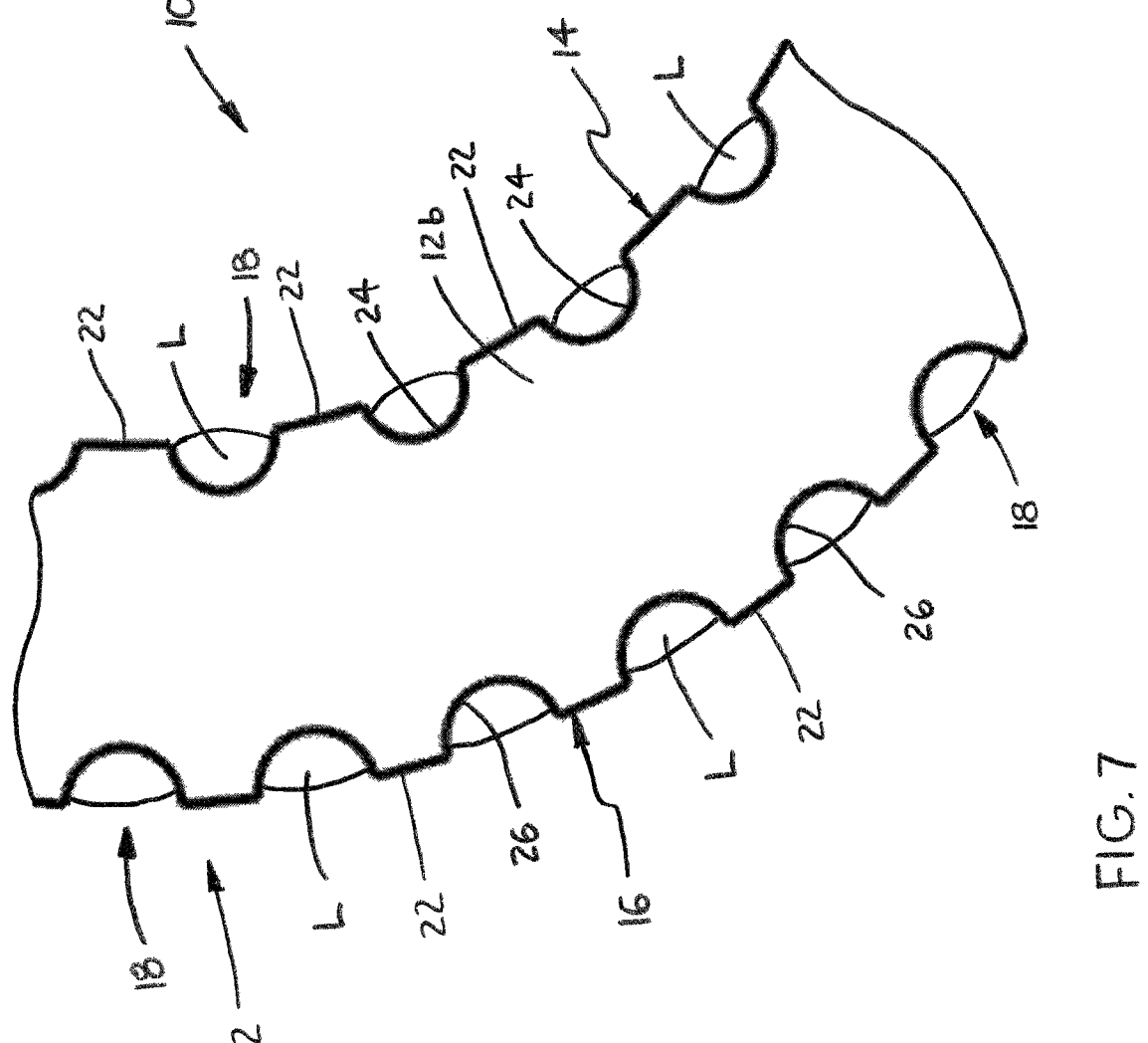
FIG. 7 is a broken-away, enlarged view of a portion of FIG. 5, showing lubricant disposed within axial channels of the separator.

As depicted in FIG. 7, a lubricant L, such as grease, heavy oil, etc., is preferably disposed within at least a portion of the inner axial channels 24 and within at least a portion of the outer axial channels 26, and is retained within each of the channels 18 by surface tension. Thus, the separator 10 preferably further comprises a quantity of lubricant L disposed within at least a portion of, and preferably within all of, the axial channels 18. By providing lubricant L within the channels 18, lubricant L is transferred to all of the balls 4 during normal operation of the ball bearing 1.

Specifically, the lubricant L within the inner axial channels 24 is distributed upon the ball 4 disposed within the pocket 20 and the lubricant L within the outer axial channels 26 is transferred onto each of the "loose" balls 4 which are adjacent to the particular separator 10 during intermittent contact between the ball 4 and the separator outer surface 16. Due to circumferential clearance between each "loose" ball 4 and the adjacent separators 10, the loose balls 4 alternatively contact both adjacent separators 10 during rotation of the ballset 5. That is, although the entire ballset 5 rolls about the bearing pitch circle PC in a single angular direction, although the direction may alternate, the circumferential clearance results in the loose balls 4 intermittently contacting both adjacent separators 10, creating a "pumping" effect that tends to distribute lubricant from the separator channels 18 to the loose balls 4 and thereafter to the raceways $R_I$, $R_O$.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A separator for a ball bearing, the ball bearing including inner and outer rings and a plurality of balls disposed between the inner and outer rings, the separator comprising:

an annular body having a centerline, opposing first and second axial ends spaced apart along the centerline, an inner circumferential surface defining a central pocket sized to receive one of the plurality of balls, an outer circumferential surface defining an outer perimeter and a plurality of axial channels extending radially outwardly from the inner circumferential surface and/or extending radially inwardly from the outer circumferential surface, each axial channel being configured to contain lubricant;

wherein the plurality of axial channels are circumferentially spaced apart about the entire perimeter of the body.

2. The separator as recited in claim 1, further comprising a lubricant contained within one or more of the axial channels.

3. The separator as recited in claim 1, wherein the plurality of axial channels includes a first set of axial channels extending radially outwardly from the inner circumferential surface and a second set of axial channels extending radially inwardly from the outer circumferential surface.

4. The separator as recited in claim 1, wherein each one of the plurality of axial channels has a first open end at the first axial end of the annular body and a second open end at the second axial end of the annular body.

5. The separator as recited in claim 1, wherein the plurality of axial channels define a plurality of axial teeth, each axial tooth being defined between two adjacent axial channels.

6. The separator as recited in claim 1, wherein the annular body has a radius extending from the centerline to the outer circumferential surface, the radius establishing a minimum spacing distance between the ball disposed within the central pocket and each one of the two adjacent balls.

7. The separator as recited in claim 1, wherein the annular body is formed of a molded polymeric material.

8. The separator as recited in claim 1, wherein the plurality of axial channels includes at least three axial channels extending radially outwardly from the inner circumferential surface and angularly spaced apart about the centerline of the annular body and/or at least three axial channels extending radially inwardly from the outer circumferential surface and angularly spaced apart about the centerline of the annular body.

9. The separator as recited in claim 8, wherein the plurality of axial channels includes twenty-four axial channels extending radially outwardly from the inner circumferential surface of the annular body and/or thirty-six axial channels extending radially inwardly from the outer circumferential surface of the annular body.

10. The separator as recited in claim 1, wherein the plurality of axial channels includes at least eight axial channels extending radially outwardly from the inner circumferential surface and angularly spaced apart about the centerline of the annular body and/or at least eight axial channels extending radially inwardly from the outer circumferential surface and angularly spaced apart about the centerline of the annular body.

11. The separator as recited in claim 1, wherein the plurality of axial channels are arranged about the centerline of the annular body so as to define a plurality of axial teeth, each axial tooth being defined between two adjacent axial channels, and the plurality of axial channels are equally spaced apart.

12. A separator for a ball bearing, the ball bearing including inner and outer rings and a plurality of balls disposed between the inner and outer rings, the separator comprising:

an annular body having a centerline, opposing first and second axial ends spaced apart along the centerline, an inner circumferential surface defining a central pocket sized to receive one of the plurality of balls, an outer circumferential surface defining an outer perimeter and a plurality of axial channels extending radially outwardly from the inner circumferential surface and/or extending radially inwardly from the outer circumferential surface, each axial channel being configured to contain lubricant;

wherein the plurality of axial channels are equally spaced apart about the entire perimeter of the annular body so as to define a plurality of axial teeth, and each axial tooth being defined between two adjacent axial channels.

\* \* \* \* \*